United States Patent
Kade et al.

(10) Patent No.: US 8,237,305 B2
(45) Date of Patent: Aug. 7, 2012

(54) AUXILIARY ELECTRICAL POWER SYSTEM FOR VEHICULAR FUEL ECONOMY IMPROVEMENT

(76) Inventors: Alexander Kade, Gross Pointe Woods, MI (US); Ruth Anne Kade, Grosse Pointe Woods, MI (US)

( * ) Notice: Subject to any disclaimer, the term of this patent is extended or adjusted under 35 U.S.C. 154(b) by 434 days.

(21) Appl. No.: 12/460,706

(22) Filed: Jul. 22, 2009

(65) Prior Publication Data

US 2010/0019570 A1 Jan. 28, 2010

Related U.S. Application Data

(60) Provisional application No. 61/082,791, filed on Jul. 22, 2008.

(51) Int. Cl.
*B60L 1/00* (2006.01)
(52) U.S. Cl. .......................... 307/9.1; 307/10.1
(58) Field of Classification Search ............ 307/9.1, 307/10.1
See application file for complete search history.

(56) References Cited

U.S. PATENT DOCUMENTS

| | | | |
|---|---|---|---|
| 4,463,305 A | 7/1984 | Wineland et al. | |
| 4,553,516 A | 11/1985 | Hasegawa | |
| 4,783,619 A * | 11/1988 | Herman | 320/127 |
| 4,789,817 A | 12/1988 | Asakura et al. | |
| 5,194,799 A | 3/1993 | Tomantschger | |
| 5,336,932 A | 8/1994 | Barske | |
| 5,788,004 A | 8/1998 | Friedman et al. | |
| 6,252,382 B1 | 6/2001 | Ganz et al. | |
| 6,404,163 B1 | 6/2002 | Kapsokavathis et al. | |
| 6,617,822 B1 | 9/2003 | Kirkpatrick | |
| 6,809,501 B2 | 10/2004 | Kapsokavathis et al. | |
| 2007/0170896 A1 | 7/2007 | Proebstle et al. | |

FOREIGN PATENT DOCUMENTS

| | | |
|---|---|---|
| DE | 4307907 A1 | 5/1994 |
| DE | 19639826 A1 | 4/1997 |
| DE | 10004309 | 10/2001 |
| EP | 1309064 | 5/2003 |
| EP | 1401081 A3 | 3/2004 |
| EP | 1705774 | 9/2006 |
| EP | 1914869 | 4/2008 |
| FR | 2495384 | 6/1982 |

* cited by examiner

*Primary Examiner* — Hal Kaplan
(74) *Attorney, Agent, or Firm* — Rohm & Monsanto, PLC

(57) ABSTRACT

Method and apparatus for improving the fuel economy of a vehicle of the type having a vehicle electrical system that includes a generator senses a vehicle voltage of the vehicle electrical system during determined intervals, and supplies an offset current from an external source of electrical energy to the vehicle electrical system in response to the sensing of a vehicle voltage of the vehicle electrical system. In this manner, the electrical power output of the generator, and its effect on fuel consumption, are reduced in response to supplying of the offset current. A source of electrical energy external to the electrical system of the motor vehicle is controlled by an electronic control unit coupled to the source of electrical energy. A power converter receives on and off commands from the electronic control unit in response to vehicle voltage measurements by the electronic control unit.

20 Claims, 3 Drawing Sheets

AUXILIARY ELECTRICAL POWER SYSTEM FOR VEHICULAR FUEL ECONOMY IMPROVEMENT

RELATIONSHIP TO OTHER APPLICATION

This application claims the benefit of the filing date of Provisional Patent Application Ser. No. 61/082,791, filed Jul. 22, 2008, the disclosure of which is incorporated herein by reference.

BACKGROUND OF THE INVENTION

1. Field of the Invention

This invention relates generally to motor vehicles, and more particularly, to a system that reduces vehicular fuel consumption by providing an electronically-controlled, externally-charged, independent, auxiliary source of electrical power to the vehicle electrical system, thereby reducing engine loading due to the on-board vehicle generator.

2. Description of the Related Art

Conventional internal combustion or diesel powered vehicles provide electrical power for various electrically-powered devices, such as fans, pumps, lights, electronic controls, and other electrical loads. This power is typically generated by an engine-driven generator. Additionally, electrical energy is stored in a battery that is used to start the vehicle and to power the other electrical devices when the engine is not running. The battery is recharged when the engine is running, requiring additional power from the generator. This electrical power generation and usage proportionately reduces vehicle fuel economy by as much as 10%, depending on the vehicle operating condition and magnitude of the electrical loads.

Older vehicle power system designs supplied a fixed, temperature-dependent voltage from the generator, often resulting in battery overcharging, reduced battery life, and lower fuel economy. Newer designs endeavor to minimize unnecessary charging, and allow more power to be provided by the battery under certain conditions. These new systems regulate the generator voltage depending on the battery state-of-charge, current flow out of the battery, and vehicle electrical load condition, resulting in improved efficiency in the operation of the generator, and consequently improved fuel economy. However, notwithstanding such improvements, the electrical power is still ultimately supplied by the engine-driven generator, and the corresponding penalty in fuel economy remains significant.

The prior art has thrust at the problem of excessive fuel consumption resulting from vehicle generator loading by providing complex and expensive systems that require extensive modification to the vehicle. Some prior art approaches require a complex mechanical transmission system to be coupled to the shaft of the vehicle generator. Other known arrangements require modification of the generator windings or circuits that disable the vehicle generator under predetermined conditions.

It is, therefore, an object of this invention to provide an arrangement wherein the necessary electrical energy is provided to the vehicle without increase in the fuel consumption that would result from generating such electrical energy by the onboard generator.

It is another object of this invention to provide an external power source that easily can be recharged It is also an object of this invention to provide an external power source that easily can be connected to a vehicle.

It is a further object of this invention to provide an arrangement that reduces vehicle generator loading without requiring modification to the vehicle electrical system, including the generator.

SUMMARY OF THE INVENTION

The foregoing and other objects are achieved by this invention which provides a method of improving the fuel economy of a vehicle of the type having a vehicle electrical system that includes a generator. In accordance with a first method aspect of the invention, there are provided the steps of:

sensing a vehicle voltage of the vehicle electrical system; and supplying an offset current from an external source of electrical energy to the vehicle electrical system in response to the step of sensing a vehicle voltage of the vehicle electrical system;

whereby an electrical power output of the generator is reduced in response to the step of supplying the offset current.

In one embodiment of this method aspect of the invention, prior to performing the step of sensing a vehicle voltage of the vehicle electrical system there is provided the further step of measuring an external source voltage of the external source of electrical energy. The step of measuring an external source voltage of the external source of electrical energy includes the further step of comparing the external source voltage of the external source of electrical energy to a predetermined minimum external source voltage value.

In a further embodiment, the step of sensing a vehicle voltage of the vehicle electrical system includes the further step of minimum comparing the vehicle voltage to a predetermined minimum vehicle voltage value. The step of sensing a vehicle voltage of the vehicle electrical system also includes, in some embodiments of the invention, the further step of maximum comparing the vehicle voltage to a predetermined maximum vehicle voltage value. A power converter arrangement is activated in response to the steps of minimum comparing and maximum comparing.

In another embodiment, there is further provided the step of performing the step of sensing a vehicle voltage of the vehicle electrical system during predeterminable intervals of time. A power converter is activated during the step of supplying the offset current, and there is further provided the step of deactivating the power converter during the predeterminable intervals of time. In some embodiments, a clock is decremented to define the predeterminable intervals of time. Also, a visual indicator is deactivated in some embodiments during the predeterminable intervals of time.

In accordance with a further method aspect of the invention, there is provided a method of improving the fuel economy of a vehicle of the type having a vehicle electrical system that includes a generator. The method includes the steps of:

sensing a vehicle voltage of the vehicle electrical system during predeterminable intervals of time;

determining whether a voltage of the vehicle electrical system is withing predetermined voltage limits;

supplying an offset current from an external source of electrical energy to the vehicle electrical system in response to the step of sensing a vehicle voltage of the vehicle electrical system and at times other than during the predeterminable intervals of time, at a rate of offset current flow corresponding to $I_O = K_1 * V_S + K_2$, where $K_1$ and $K_2$ are calibration constants;

whereby an electrical power output of the generator is reduced in response to the step of supplying the offset current.

The rate of offset current is limited in an advantageous embodiment to the condition that $I_O < I_{LIM}$.

Prior to performing the step of supplying an offset current from an external source of electrical energy to the vehicle electrical system there is provided, in some embodiments of the invention, the further step of measuring a voltage of the external source of electrical energy. The step of supplying an offset current from an external source of electrical energy includes, in some embodiments, the step of activating a power converter. In a further embodiment, there is provided the further step of deactivating the power converter during the predetermined intervals.

In accordance with an apparatus aspect of the invention, there is provided an arrangement for reducing a load on a generator of and electrical system of a motor vehicle. The arrangement is provided with a source of electrical energy external to the electrical system of the motor vehicle. An electronic control unit having a first voltage input is coupled to the source of electrical energy external to the electrical system of the motor vehicle. In addition, a power converter is coupled to a command output of the electronic control unit, the power converter having active and inactive states in response to commands issued at the command output of the electronic control unit. A vehicle voltage terminal is coupled to the electrical system of the motor vehicle and provides a vehicle voltage signal to a vehicle voltage signal input of the electronic control unit.

In one embodiment of this apparatus aspect of the invention, there is provided a current sensor for providing a current signal responsive to the magnitude of an offset current provided by the power converter. The current signal is provided to an offset current signal input of the electronic control unit.

In a further embodiment, the offset current is limited by the electronic control unit not to exceed a predetermined offset current magnitude $I_{LIM}$ corresponding to the relationship $I_O < I_{LIM}$. In still further embodiments, the offset current is issued at a rate of offset current flow responsive to the vehicle voltage signal, corresponding to $I_O = K_1 * V_S + K_2$, where $K_1$ and $K_2$ are calibration constants.

In a practicable embodiment of the invention, the source of electrical energy external to the electrical system of the motor vehicle is an auxiliary battery.

In a further practicable embodiment of the invention, an externally-charged, electronically-controlled auxiliary power source is electrically coupled to a motor vehicle via a power outlet, such as is commonly used as a cigarette lighter plug. Such vehicle power outlets are well-known and used to supply vehicle power to various accessory devices. In the practice of this embodiment of the invention, electrical energy is supplied through the power outlet into the vehicle electrical system to reduce the power required of the generator when the vehicle is being operated. The system is automatically activated and deactivated in response to a sensed vehicle voltage. The sense vehicle voltage is characterized by values that correspond to determinable vehicle operating conditions, such as "engine running" or "battery charging" states.

In an advantageous embodiment, the power source includes a rechargeable battery pack that can be formed of any of a variety of chemistries and technologies, including but not limited to, lead-acid, nickel-metal hydride, lithium ion, or fuel cell battery types. In addition, a variable output DC/DC voltage converter (VC) can be employed in the practice of the invention.

The auxiliary power source is controlled by an electronic control unit (ECU) that senses the vehicle system voltage ($V_S$), the external power source battery voltage ($V_I$), and the electrical current ($I_O$) that is flowing from the external power source to the vehicle. A small, low-power portion of the ECU is powered from the vehicle, when the power plug is inserted. If adequate vehicle voltage ($V_S$) is sensed from this connection, the auxiliary power unit is enabled, and begins operation. The ECU controls an output voltage ($V_O$) from the power source to provide the desired value of $I_O$ to the vehicle electrical system. The external power source acts as a controlled current source, and prevents current flow from the vehicle into the power control unit. This value of $I_O$ is limited to a maximum current limit value of $I_{LIM}$ by the ECU, which corresponds to the values determined by vehicle fuses and wiring, typically less than 20 Amperes.

The ECU also turns the power source on and off depending on the value $V_S$. If $V_S$ is less than a predetermined value, typically less than 13 volts, the ECU turns off the external power source. This low value of $V_S$ corresponds to a non-running engine, or a fully-charged onboard vehicle battery. When the voltage rises above this level, the external source is electrically connected to the vehicle system, and $V_O$ is adjusted to inject a specified value of current from the external power source into the vehicle electrical system, thereby reducing the onboard generator load and reducing fuel consumed. Additionally, if the vehicle system voltage exceeds a predetermined high-voltage limit (typically 16 Volts), the ECU disables the external source to prevent damaging the vehicle. The vehicle system voltage is checked at regular, short time intervals typically to determine the need to continue providing external power. Typically, this sampling is performed at a fixed rate, which is typically between 1-10 seconds. The External supply is briefly de-energized, typically for less than 0.25 seconds, to measure the vehicle system voltage. If the vehicle system voltage is between the low and high thresholds, the external unit is re-energized. If these conditions are not valid, the unit remains de-energized until the next sampling period, where the process is repeated.

In addition to the ECU controls, input and output circuit breakers or fuses are provided to disconnect the external power unit from the vehicle in the event of a short-circuit or other electrical issues.

It is a feature of the present invention that vehicle fuel economy is improved by reducing the generator power required to operate the vehicle electrical loads. As indicated above, this is based on the sensing of a vehicle voltage at regular intervals, and supplying a controlled, variable current to offset generator output current.

The system is turned on and off by sensing the vehicle operating condition and the condition of the external power supply battery. The output energy of the inventive system is calculated to optimize fuel economy benefits, auxiliary battery capacity, and time between auxiliary battery charges. This is achieved, in accordance with the invention, without requiring structural changes to the vehicle and by using existing automotive power outlets. System status and its operational state are identified by at least one visual indicator, including indication of the need for recharging an auxiliary battery.

BRIEF DESCRIPTION OF THE DRAWING

Comprehension of the invention is facilitated by reading the following detailed description, in conjunction with the annexed drawing, in which.

DETAILED DESCRIPTION

The following detailed description is merely exemplary in nature and is not intended to limit the invention or the application and uses of the invention. Furthermore, there is no intention to be bound by any expressed or implied theory presented in the preceding statement of technical field, the background, the brief summary, or the following detailed description.

Figure 1:
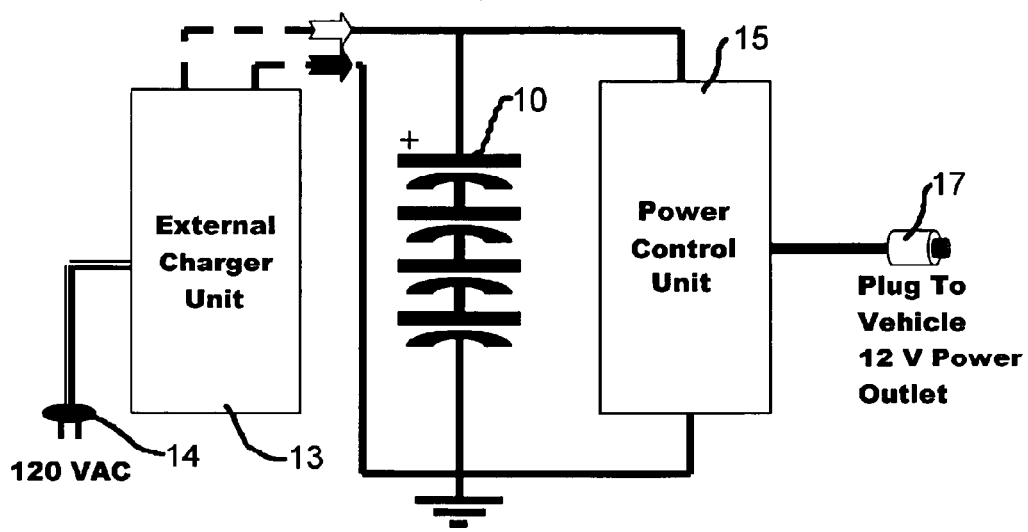
FIG. 1 is a simplified simplified schematic representation of an external power system constructed in accordance with the invention.

FIG. 1 is a simplified simplified schematic representation of an external power system constructed in accordance with the invention. As shown in this figure, a rechargeable battery 10 is initially charged by an external charger 13, that in this embodiment of the invention is connectable to a standard 120 V electrical supply by a convention 120 V plug 14. Battery 10 and a power control unit 15 are connected to a vehicle (not shown), in this specific illustrative embodiment of the invention, via a power outlet connector 17, or similar means.

Figure 2:
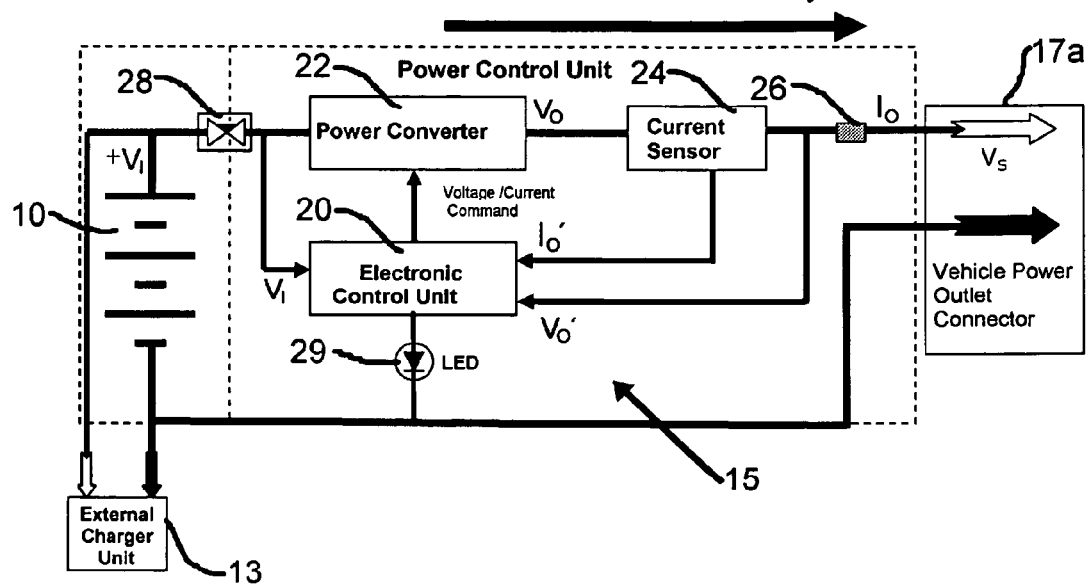
FIG. 2 is a simplified schematic representation of the external power system of the present invention showing certain elements of the power control unit.

FIG. 2 is a simplified schematic representation of the external power system of the present invention shown in FIG. 1, illustrating in additional detail certain elements of power control unit 15. Elements of structure that have previously been discussed are similarly designated. Power control unit 15 is comprised of an electronic control unit (ECU) 20, a DC/DC voltage converter 22, a current sensor 24, a circuit breaker 26, and optionally, a fuse 28 and a light emitting diode 29 or other indicator. ECU 20 receives data corresponding to the magnitude of $I_O$ (designated in the figure as $I_O'$) from current sensor 24, as well as data corresponding to the magnitude of $V_O$ (designated in the figure as $V_O'$), and commands power converter 22 to supply current $I_O$ to the vehicle (not shown) by adjusting the magnitude of output voltage $V_O$. LED 29 is, in this embodiment of the invention, turned on while current $I_O$ is being supplied to the vehicle.

External battery 10 is recharged to full capacity by operation of external charger unit 13. Circuit breaker 26, and in some embodiments, fuse 28 are effective to disconnect the power control unit 15 from the vehicle, or from external charger 13, in the event of a short-circuit or other electrical failure. In this embodiment of the invention, power control unit 15 is connected to the vehicle (not shown) by a connector 17a, which may be a standard 12 V vehicle plug, or any other form of connector known to persons of skill in the art. Of course, in other embodiments power control unit 15 can be wired directly to the electrical system of the vehicle. As shown in this figure, vehicle system voltage $V_S$ is sensed via connector 17a.

In some embodiments of the invention, LED 29 is illuminated intermittently, such as by flashing, to indicate that recharging of battery 10 is required. In other embodiments, a second LED (not shown) is included and illuminated to indicate the discharged condition of the battery.

In an advantageous embodiment of the invention, battery 10 is an absorbent-glass-mat (AGM) deep-cycle-type battery, a nickel-metal hydride battery, a lithium ion battery, or other suitable rechargeable battery, preferably of the type designed for frequent deep-cycle (charge-discharge) use.

Figure 3:
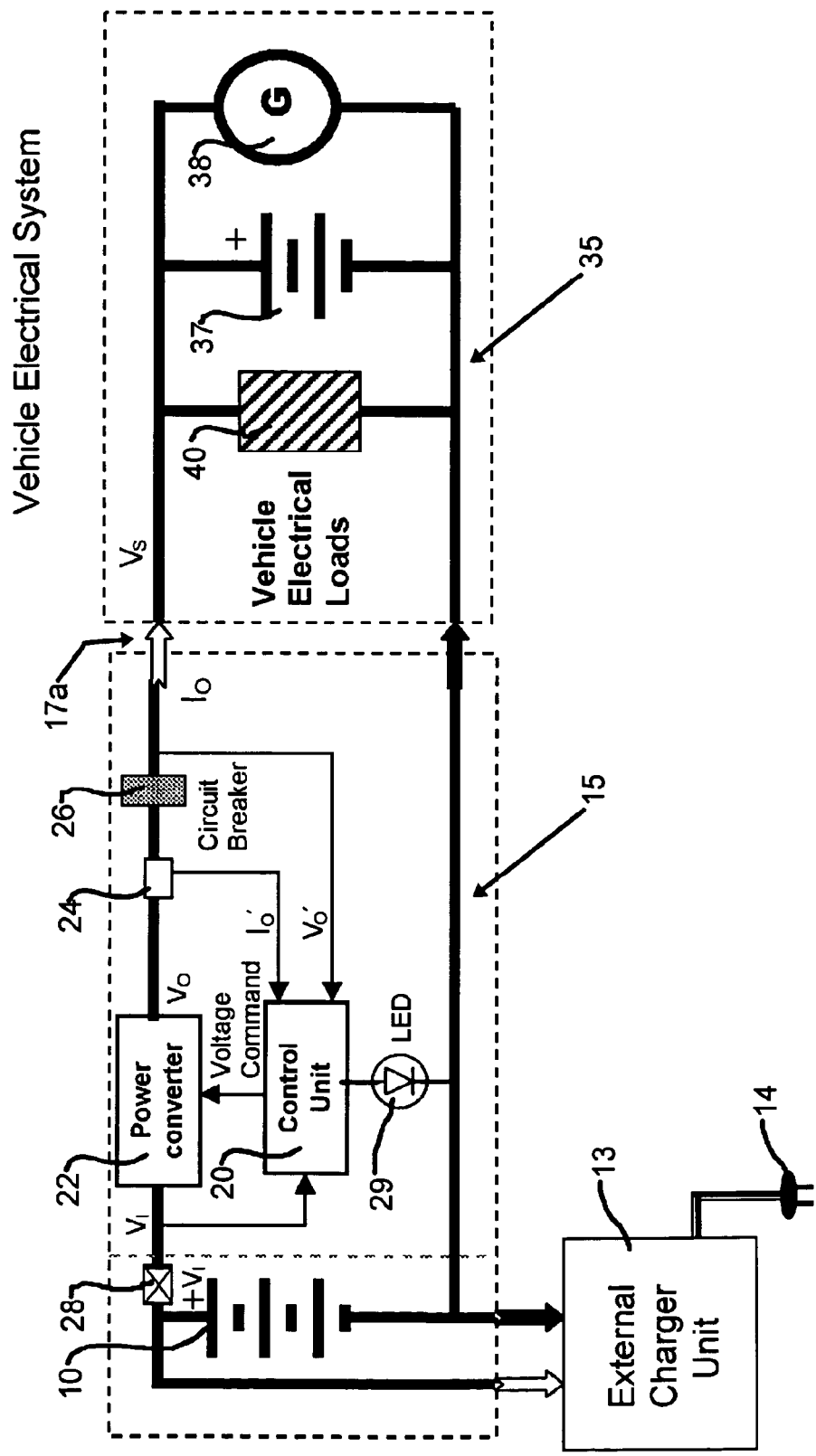
FIG. 3 is a simplified schematic representation of the external power system of the present invention coupled to certain electrical systems of a motor vehicle.

FIG. 3 is a simplified schematic representation of the external power system of the present invention coupled to certain electrical systems of a motor vehicle (not shown). Elements of structure that have previously been discussed are similarly designated. In this figure, there is illustrated power control unit 15 connected to a vehicle electrical system 35. Vehicle electrical system 35 is shown in this figure to include a primary vehicle battery 37, a generator 38, which may be an alternator, and a lumped-parameter electrical load block 40 that represents the electrical equivalent of various electrical devices (not specifically designated) in the vehicle.

Figure 4:
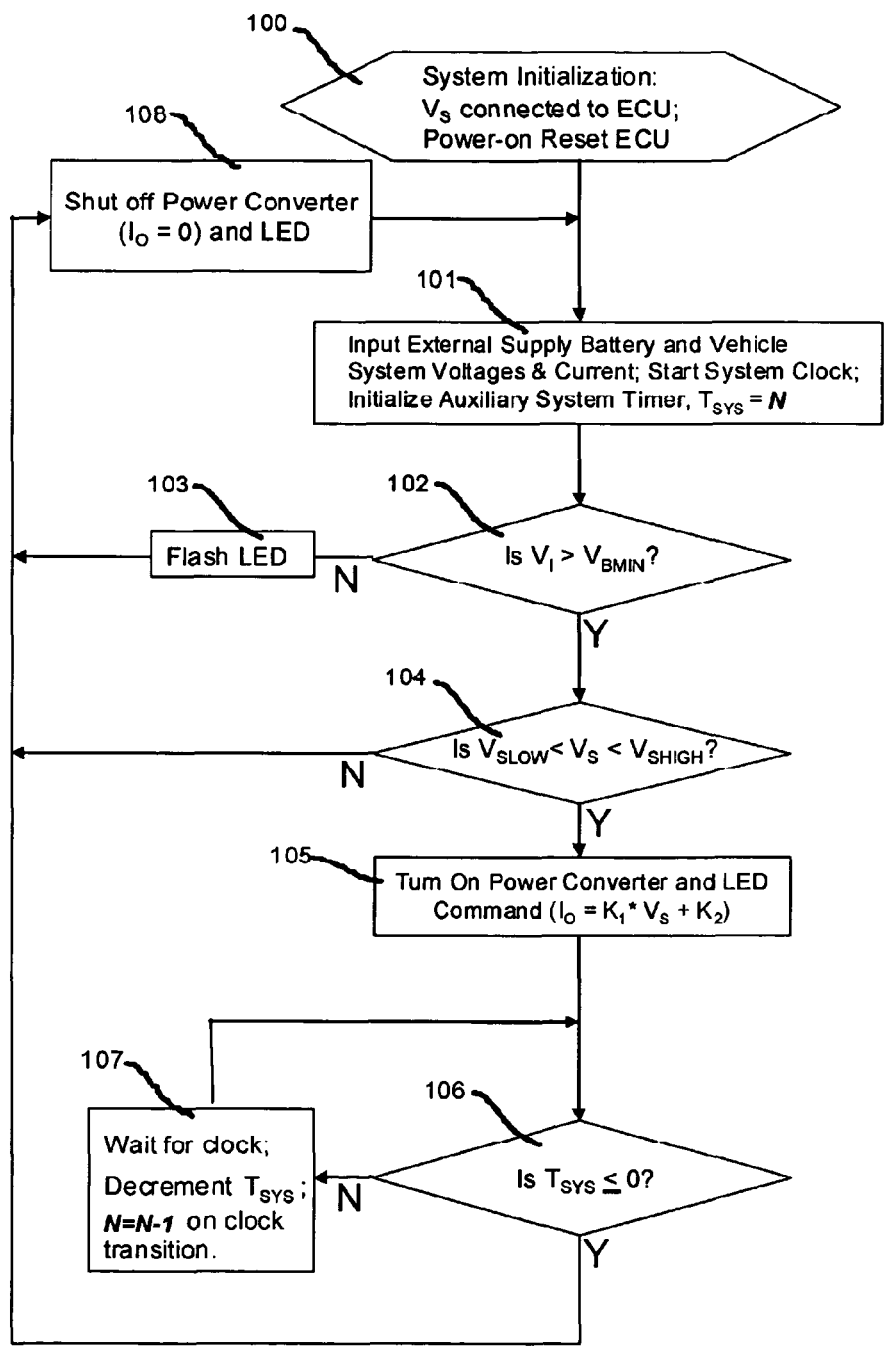
FIG. 4 is a simplified flowchart that illustrates in block and line form the ECU control logic for the auxiliary power unit of the present invention.

FIG. 4 is a simplified flowchart that illustrates in block and line form the control logic for ECU 20 of power control unit 15 of the present invention, which executes a control algorithm. Initially, external charger unit 13 is in the "off" state. At logic step 100, power control unit 15 is plugged into the vehicle power outlet (not shown), illustratively via 12 V plug 17, and external charger unit 13 is powered up to sense vehicle system voltage $V_S$ and to initialize power control unit 15.

At function block 101, the voltages of auxiliary battery 10 ($V_I$) and the vehicle system ($V_S$) are measured, and an auxiliary power system timer, $T_{SYS}$, is initialized to a value N.

At function block 102, the voltage $V_1$ of battery 10 is compared to a value $V_{BMIN}$. Typically, $V_{BMIN}$ is approximately 11.5 V for a nominal 12 V battery system.

If voltage $V_I$ is less than or equal to $V_{BMIN}$, the system LED is caused to flash at function block 103, to indicate that there is a need to recharge auxiliary battery 10. At function block 108, the system returns to an "off" condition. However, if voltage $V_I$ is greater than $V_{BMIN}$, then at function block 104 the system compares vehicle system voltage $V_S$ to a predetermined, calibrated value $V_{SLOW}$, which is typically above 13 V, and to a second calibrated value, $V_{SHIGH}$, which is typically over 15.5 V. If the value of $V_S$ is between these two limit values, ECU 20 issues a command at function block 105 that causes power converter 22 to commence supplying current of value $I_O$ to the vehicle. This current is measured by the current sensor 24. The amount of current to be supplied to the vehicle is determined based on the vehicle system voltage ($V_S$), calculated by the following equation:

$$\text{Current output, } I_O = K_1 * V_S + K_2,$$

where $K_1$ and $K_2$ are calibration constants, and with the condition that $I_O < I_{LIM}$ (the current limit $I_{LIM}$ being typically 20 amperes or other appropriate calibrated value).

A typical calibration would provide approximately 15 amps at a vehicle voltage of 14.5V, and 10 amps at 13.5V. A simplified constant-current supply method ($I_O = I_{LIM}$) is also a potential implementation, along with other variations; but while this will provide some benefits, these variants will not maximize the tradeoff between external battery capacity (size), time between re-charges, and fuel economy improvement.

At function blocks 106 and 107, the vehicle system voltage $V_S$ is checked at regular, calibrated intervals, $T_{SYS}$, (typically 1-10 seconds) by switching "off" the voltage converter 22 output for one system clock period. This typically is a short period of time, usually less than approximately 250 milliseconds. At this point, the present system repeats steps 101-108, and the auxiliary power is switched "on" or "off," depending on the results of the logic steps at function blocks 102 and 104.

When $V_S$ falls below $V_{SLOW}$ (typically <13 V) or $V_S$ exceeds $V_{SHIGH}$ (typically >15.5V) at function blocks 102 and 104, or if battery 10 is discharged ($V_I < V_{BMIN}$) at function block 102, ECU 20 turns off power converter 22, thereby effectively disconnecting power control unit 15 from the vehicle.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of improving the fuel economy of a vehicle of the type having a vehicle electrical system that includes a generator, the method comprising the steps of:
    sensing a vehicle voltage of the vehicle electrical system; and
    supplying an offset current from an external source of electrical energy to the vehicle electrical system in response to said step of sensing a vehicle voltage of the vehicle electrical system;
    whereby an electrical power output of the generator is reduced in response to said step of supplying the offset current.

2. The method of claim 1, wherein prior to performing said step of sensing a vehicle voltage of the vehicle electrical system there is provided the further step of measuring an external source voltage of the external source of electrical energy.

3. The system of claim 2, wherein said step of measuring an external source voltage of the external source of electrical energy comprises the further step of comparing the external source voltage of the external source of electrical energy to a predetermined minimum external source voltage value.

4. The method of claim 1, wherein said step of sensing a vehicle voltage of the vehicle electrical system comprises the further step of minimum comparing the vehicle voltage to a predetermined minimum vehicle voltage value.

5. The method of claim 4, wherein said step of sensing a vehicle voltage of the vehicle electrical system comprises the further step of maximum comparing the vehicle voltage to a predetermined maximum vehicle voltage value.

6. The method of claim 5, wherein there is further provided the step of activating a power converter arrangement in response to said steps of minimum comparing and maximum comparing.

7. The method of claim 1, wherein there is further provided the step of performing said step of sensing a vehicle voltage of the vehicle electrical system during predeterminable intervals of time.

8. The method of claim 7, wherein said step of supplying an offset current from an external source comprises the step of activating a power converter, and there is further provided the step of deactivating the power converter during the predeterminable intervals of time.

9. The method of claim 8, wherein there is further provided the step of decrementing a clock to define the predeterminable intervals of time.

10. The method of claim 8, wherein there is further provided the step of deactivating a visual indicator during the predeterminable intervals of time.

11. A method of improving the fuel economy of a vehicle of the type having a vehicle electrical system that includes a generator, the method comprising the steps of:
    sensing a vehicle voltage $V_S$ of the vehicle electrical system during predeterminable intervals of time;
    determining whether the vehicle voltage $V_S$ of the vehicle electrical system is within predetermined voltage limits; and
    supplying an offset current from an external source of electrical energy to the vehicle electrical system in response to said step of sensing a vehicle voltage of the vehicle electrical system and at times other than during the predeterminable intervals of time, at a rate of offset current flow corresponding to $I_O=K_1*V_S+K_2$, where $K_1$ and $K_2$ are calibration constants;
    whereby an electrical power output of the generator is reduced in response to said step of supplying the offset current.

12. The method of claim 11, wherein the rate of offset current is limited to $I_{LIM}$, corresponding to the condition that $I_O<I_{LIM}$.

13. The method of claim 11, wherein prior to performing said step of supplying an offset current from an external source of electrical energy to the vehicle electrical system there is provided the further step of measuring a voltage of the external source of electrical energy.

14. The method of claim 11, wherein said step of supplying an offset current from an external source of electrical energy comprises the step of activating a power converter.

15. The method of claim 14, wherein there is provided the further step of deactivating the power converter during the predeterminable intervals of time.

16. An arrangement for reducing a load on a generator of and electrical system of a motor vehicle, the arrangement comprising:
    a source of electrical energy external to the electrical system of the motor vehicle;
    an electronic control unit having a first voltage input coupled to said source of electrical energy external to the electrical system of the motor vehicle;
    a power converter coupled to a command output of said electronic control unit, said power converter having active and inactive states in response to commands issued at the command output of said electronic control unit; and
    a vehicle voltage terminal for coupling to the electrical system of the motor vehicle and providing a vehicle voltage signal $V_S$ to a vehicle voltage signal input of said electronic control unit.

17. The arrangement of claim 16, wherein there is further provided a current sensor for providing a current signal responsive to the magnitude of an offset current provided by said power converter, the current signal being provided to an offset current signal input of said electronic control unit.

18. The arrangement of claim 17, wherein said offset current is limited by said electronic control unit not to exceed a predetermined offset current magnitude $I_{LIM}$ corresponding to the relationship $I_O<I_{LIM}$.

19. The arrangement of claim 17, wherein said offset current is issued at a rate of offset current flow responsive to the vehicle voltage signal, corresponding to $I_O=K_1*V_S+K_2$, where $K_1$ and $K_2$ are calibration constants.

20. The arrangement of claim 16, wherein said source of electrical energy external to the electrical system of the motor vehicle comprises an auxiliary battery.

* * * * *